US010320866B2

(12) United States Patent
Matejka et al.

(10) Patent No.: US 10,320,866 B2
(45) Date of Patent: Jun. 11, 2019

(54) CHRONOLOGICAL EVENT INFORMATION FOR MULTIMEDIA CONTENT

(71) Applicant: AUTODESK, Inc, San Rafael, CA (US)

(72) Inventors: Justin Frank Matejka, Newmarket (CA); Tovi Grossman, Toronto (CA); George Fitzmaurice, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 18 days.

(21) Appl. No.: 14/730,199

(22) Filed: Jun. 3, 2015

(65) Prior Publication Data

US 2016/0358626 A1  Dec. 8, 2016

(51) Int. Cl.
*H04L 29/06* (2006.01)
*G11B 27/10* (2006.01)
*G11B 27/32* (2006.01)

(52) U.S. Cl.
CPC ........ *H04L 65/4069* (2013.01); *G11B 27/102* (2013.01); *G11B 27/322* (2013.01)

(58) Field of Classification Search
USPC ................................................. 386/239–248
See application file for complete search history.

(56) References Cited

U.S. PATENT DOCUMENTS

| | | | | |
|---|---|---|---|---|
| 2003/0093790 | A1* | 5/2003 | Logan | G06F 17/30265 725/38 |
| 2010/0180292 | A1* | 7/2010 | Epstein | H04N 5/44513 725/32 |
| 2012/0115122 | A1* | 5/2012 | Bruce | G09B 7/00 434/323 |
| 2013/0297706 | A1* | 11/2013 | Arme | G06F 17/30038 709/206 |
| 2015/0247745 | A1* | 9/2015 | McClogan | B25B 23/1425 702/33 |
| 2015/0382079 | A1* | 12/2015 | Lister | H04N 21/8456 725/38 |
| 2016/0267403 | A1* | 9/2016 | Hoffart | G06F 17/3028 |

* cited by examiner

*Primary Examiner* — Hung Q Dang
(74) *Attorney, Agent, or Firm* — Artegis Law Group, LLP (57) ABSTRACT

Disclosed is a technique for generating chronological event information. The technique involves receiving event data comprising a plurality of events, where each event is associated with a different position in a video stream. The technique further involves determining that a current playhead position in the video stream corresponds to a first position associated with a first event, and, in response, causing the first event to be displayed in an event list as a current event, causing a second event to be displayed in the event list as a previous event, where the second event is associated with a second position in the video stream that is before the first position, and causing a third event to be displayed in the event list as a next event, where the third event is associated with a third position in the video stream that is after the first position.

17 Claims, 7 Drawing Sheets

CHRONOLOGICAL EVENT INFORMATION FOR MULTIMEDIA CONTENT

BACKGROUND OF THE INVENTION

Field of the Invention

The present invention generally relates to multimedia content, and, more specifically, to an approach for generating chronological event information for multimedia content.

Description of the Related Art

Computer-based videos provide a convenient way for users to access various types of multimedia content, such as video dips, tutorial videos, and full-length movies. Tutorial videos are often implemented to train users to operate various products, such as software applications. Typically, a tutorial video for a software application instructs a user how to execute various commands to implement different functions via a cursor or pointer. For example, a tutorial video may show a pointer selecting a drop-down menu and selecting an item within the menu. Often, a narrator will describe the commands and functions throughout the video.

Despite the inclusion of comprehensive narration in video tutorials, various issues make it difficult for a user to follow the actions performed by the narrator of the video. In particular, if a video tutorial is moving quickly, a user may have difficulty determining which command is currently being demonstrated by the narrator. Consequently, the user may miss important details regarding the command or subsequent commands being demonstrated in the video. Additionally, the dimensions of the video tutorial may be too small for a user to observe which button or menu item is being selected, particularly when selections occur quickly. Furthermore, if a user misses or cannot recall instructions provided by the narrator for a particular command, the user is required to search through the video in order to locate and replay the relevant section.

As the foregoing illustrates, a more effective way for users to view and interact with multimedia content would be useful.

SUMMARY OF THE INVENTION

One embodiment of the present invention sets forth a method for generating chronological event information. The method involves receiving event data comprising a plurality of events, where each event is associated with a different position in a video stream. The method further involves determining that a current playhead position in the video stream corresponds to a first position in the video stream associated with a first event of the plurality of events, and, in response, causing the first event to be displayed in an event list as a current event, causing a second event of the plurality of events to be displayed in the event list as a previous event. The second event is associated with a second position in the video stream that is before the first position in the video stream. The method further involves causing a third event of the plurality of events to be displayed in the event list as a next event, where the third event is associated with a third position in the video stream that is after the first position in the video stream.

Further embodiments provide a non-transitory computer-readable medium and a computing device to carry out the method set forth above.

Advantageously, the disclosed techniques enable a user to efficiently interact with and navigate through multimedia content, such as a video stream, without spending a significant amount of time locating various events in the multimedia content. Thus, the disclosed technique, among other things, increases the ability of a user to observe and obtain information from a video by providing efficient event navigation and event-related information.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
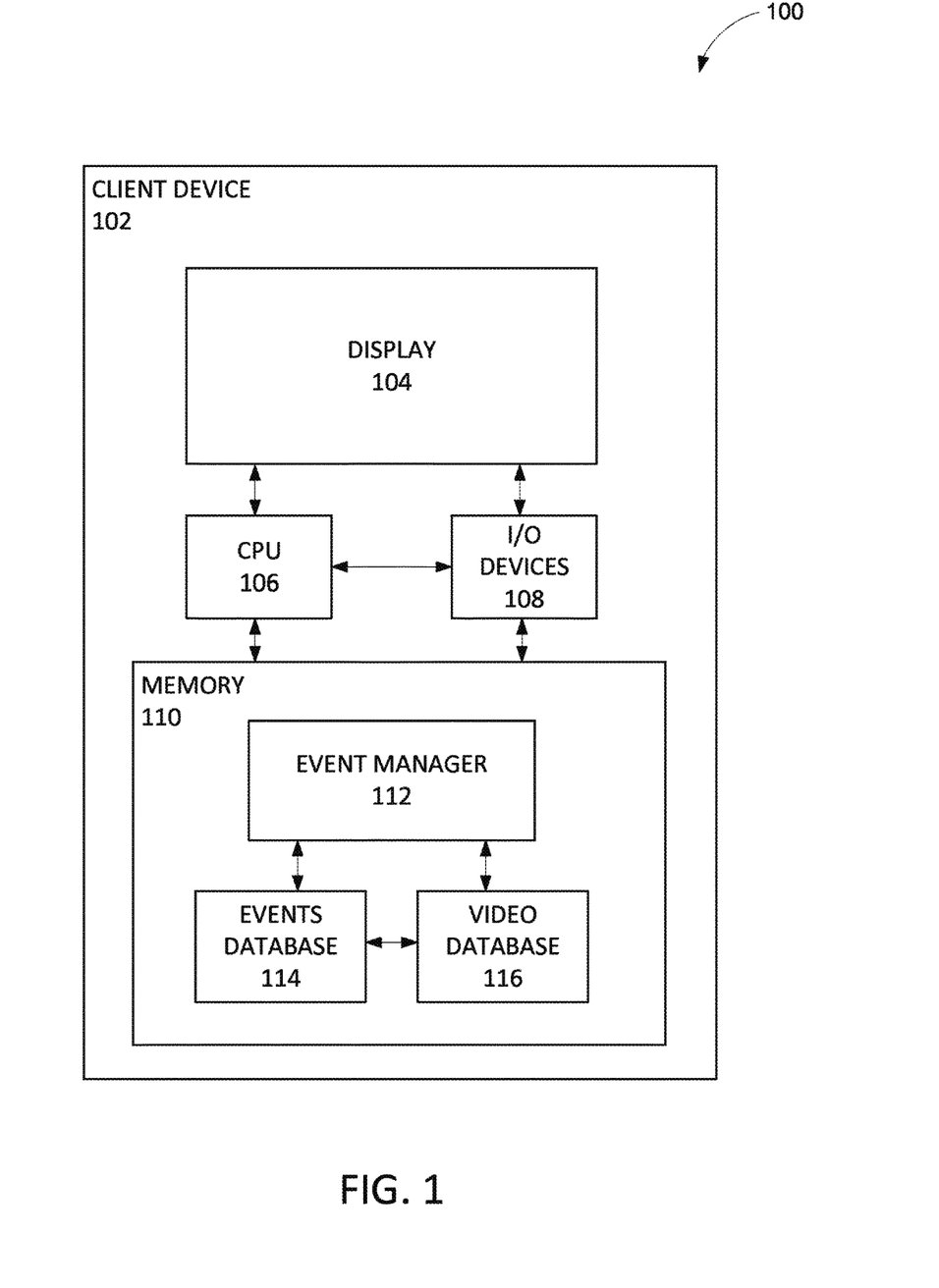
FIG. 1 illustrates a block diagram of a client device configured to implement one or more aspects of the present invention.

FIG. 1 illustrates a block diagram 100 of a client device 102 configured to implement one or more aspects of the present invention. As shown, the client device 102 includes, without limitation, a display 104, a central processing unit (CPU) 106, one or more input/output (I/O) devices 108, and a memory 110. The memory 110 is configured to store an event manager 112, an events database 114, and a video database 116. The video database 116 is configured to store one or more video streams. The events database 114 is configured to store data and/or metadata associated with one or more video streams, such as a video stream stored in the video database 116. The CPU 106 is configured to execute the event manager 112.

Further, the client device 102 and/or I/O devices 108 are configured to cause video streams stored in the video database 116 to be displayed on the display 104. In one embodiment, the client device 102 is also configured to receive video streams from one or more other sources, such as a server or other device, and store them in the video database 116.

In various embodiments, the event manager 112 executing on the client device 102 may obtain data associated with one or more video streams stored in the video database 116. The event manager 112 may also create metadata associated with the one or more video streams and store the data and/or the metadata in the events database 114. The data and/or the metadata may correspond to one or more events, where each event is associated with a different position in a corresponding video stream. Thus, the data and/or the metadata may include one or more events and a corresponding timestamp or other temporal indicator that indicates a position associated with the event. Further, in some embodiments, an event may be associated with a plurality of positions in a corresponding video stream. The plurality of positions may be within a time interval of the video stream. Thus, the data and/or metadata may include time stamps or other temporal indicators associated with a beginning of the time interval, an end of the time interval, and/or one or more points within the time interval. In various embodiments, the event manager 112 may determine that an event of a video stream is associated with a position in the video stream if the event or at least a portion of the event occurs within a threshold period of time before or after the position in the video stream. The event manager 112 may be any type of software application suitable for performing the above functions.

In the exemplary embodiment, the event manager 112 receives event data including one or more events. Each of the events is associated with a different position in a video stream stored in the video database 116. If the event manager 112 determines that a current playhead position in the video stream corresponds to a position in the video stream associated with one of the events, then the event manager 112 causes the event to be displayed in an event list as a current event. In some embodiments, the current event is displayed with an emphasis, such as bold text, highlighted text, larger text, and/or additional graphics within or near the current event.

The event list may be displayed within the display 104 while the video stream is being displayed. For example, the event list may be displayed over the video stream (e.g., as an overlay), enabling the event list to be viewed while the video stream is playing in the background or in another portion of the display 104. The event list may include a list of events associated with different positions in the video stream.

In various embodiments, the event manager 112 also causes a previous event to be displayed in the event list. The previous event is associated with a position in the video stream that is before the position associated with the current event. Further, in some embodiments, the event manager 112 also causes a next event to be displayed in the event list. The next event is associated with a position in the video stream that is after the position associated with the current event.

In some embodiments, the events correspond to the execution of commands within a software application. For example, the video stream may be a software application tutorial. Thus, at least a portion of the events in the event list may correspond to the execution of one or more commands. In other embodiments, the events correspond to different portions of a conversation, such as movie dialogue. For example, the video stream may be a movie or video that includes dialogue. Thus, the events in the event list may correspond to words or sentences. In various embodiments, depending on the type of video stream, any suitable content may be used for events to form the event list.

In various embodiments, the event manager 112 receives a selection of an event included in the event list. For example, a user may cause a pointer to hover over an event of the event list or the user may click a mouse key or other key while the pointer is hovering over an event included in the event list. In one embodiment, the event manager 112 causes data associated with the selected event to be displayed in response to receiving the selection of the event. For example, hovering a pointer over or near an event included in the event list may cause a tooltip or other description related to the event to appear.

In one embodiment, if multiple events included in an event list are identical, are associated with the same operation or activity, or are associated with the same type of operation or activity, then the multiple events may be collapsed into a single event of the event list. For example, if three events in a row are associated with a "circle" command of a drawing application, then the three events may be collapsed into a single "circle" command event.

In some embodiments, other data related to an event of the event list may be displayed within the event list or within a threshold distance of the event. Such data may include tool setting values, tool parameter values, hotkeys associated with commands, and keyboard input associated with the event, such as keyboard input that is used to activate a tool associated with the event. In one embodiment, icons may be displayed as events instead of text or words. In another embodiment, receiving a user selection of an event causes the event manager 112 to update the current playhead position to a different position in the video stream that corresponds to the selected event.

Although FIG. 1 shows the event manager 112 as a separate software module, it is also contemplated that the event manager 112 may include the events database 114 and/or the video database 116. Additionally, the event manager 112 may be capable of controlling, communicating with, and receiving information from a variety of different software applications executing on the client device 102. For example, the event manager 112 may be capable of controlling one or more functions of a media player that displays a video stream stored in the video database 116.

In one embodiment, client device 102 may be any type of electronic device that enables a user to connect to (e.g., via the Internet, a local area network (LAN), an ad hoc network, etc.) and communicate with one or more other devices that provide the same or similar functionality as client device. Exemplary electronic devices include, without limitation, desktop client devices, portable or hand-held client devices, laptops, tablets, smartphones, mobile phones, personal digital assistants (PDAs), etc. In one embodiment, another device in communication with the client device may be configured to provide a portion of or all of the functionality of described for the client device 102, including the event manager 112, the events database 114, and the video database 116. In such an embodiment, the client device 102 and the other device may communicate directly with each other, for example, via a peer-to-peer protocol.

Figure 2:
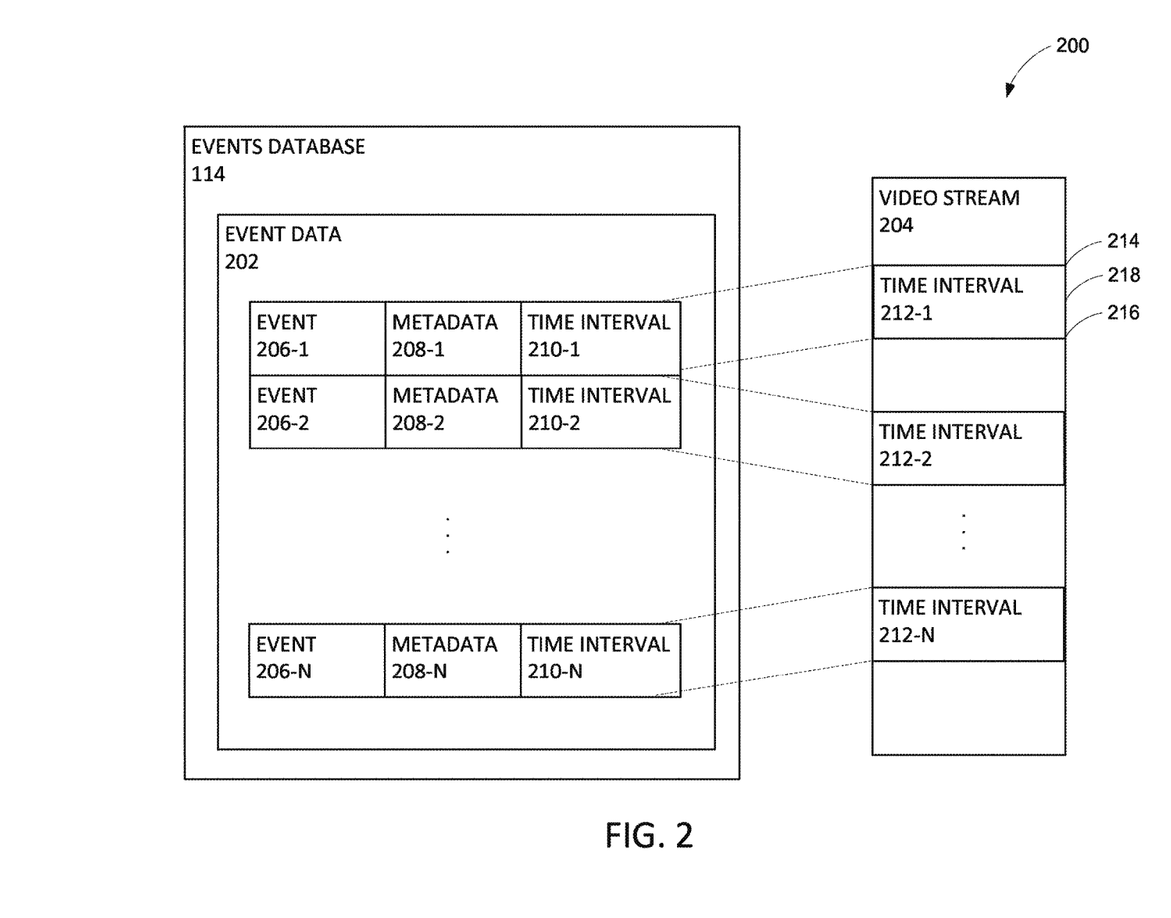
FIG. 2 sets forth an events database that may be implemented in conjunction with the client device of FIG. 1, according to various embodiments of the invention.

FIG. 2 sets forth an events database that may be implemented in conjunction with the client device 102 of FIG. 1, according to one embodiment of the invention. As shown, the exemplary events database 114 includes event data 202 that corresponds to a video stream 204 stored in the video database 116. In various embodiments, the events database 114 may include one or more additional collections of event data, each collection of event data corresponding to a different video stream in the video database 116.

The event data 202 includes one or more events 206, each of which correspond to metadata 208 and a time interval 210. The metadata 208 may be any type of suitable information that is associated with an event. For example, the metadata 208-1 may be information for a tooltip, tool setting values, tool parameter values, hotkeys associated with commands, and keyboard input associated with the event, such as keyboard input that is used to activate a tool associated with the event. The metadata may also include data hierarchies associated with an event.

Each time interval 210 corresponds to a time interval 212 within the video stream 204. For example, the time interval 210-1 for event 206-1 corresponds to the time interval 212-1 of the video stream 204. As shown, the time interval 212-1 starts at a position 214 of the video stream 204, ends at a position 216 of the video stream 204, and includes a position 218 of the video stream 204 in between the position 214 and the position 216. Thus, the event 206-1 corresponds to a time interval in the video stream 204 that begins at point 214 and ends at point 216. Furthermore, the event 206-1 is associated with the position 214, the position 216 and the position 218. In general, an event 206 may be associated with a time interval and/or any number of positions located within a time interval. In the example embodiment, the positions within the time interval 212-1 that are associated with the event 206-1 may be stored within the metadata 208-1, the time interval 210-1, or any other suitable location within the event data 202.

As discussed above, the event may correspond to any action or activity that occurs within the video stream 204, such as executing a command in a software application or words spoken in a conversation. In the example embodiment, the event 206-2 corresponds to the time interval 212-2 of the video stream 204 and a final event 206-N corresponds to a final time interval 212-N of the video stream 204.

Figure 3:
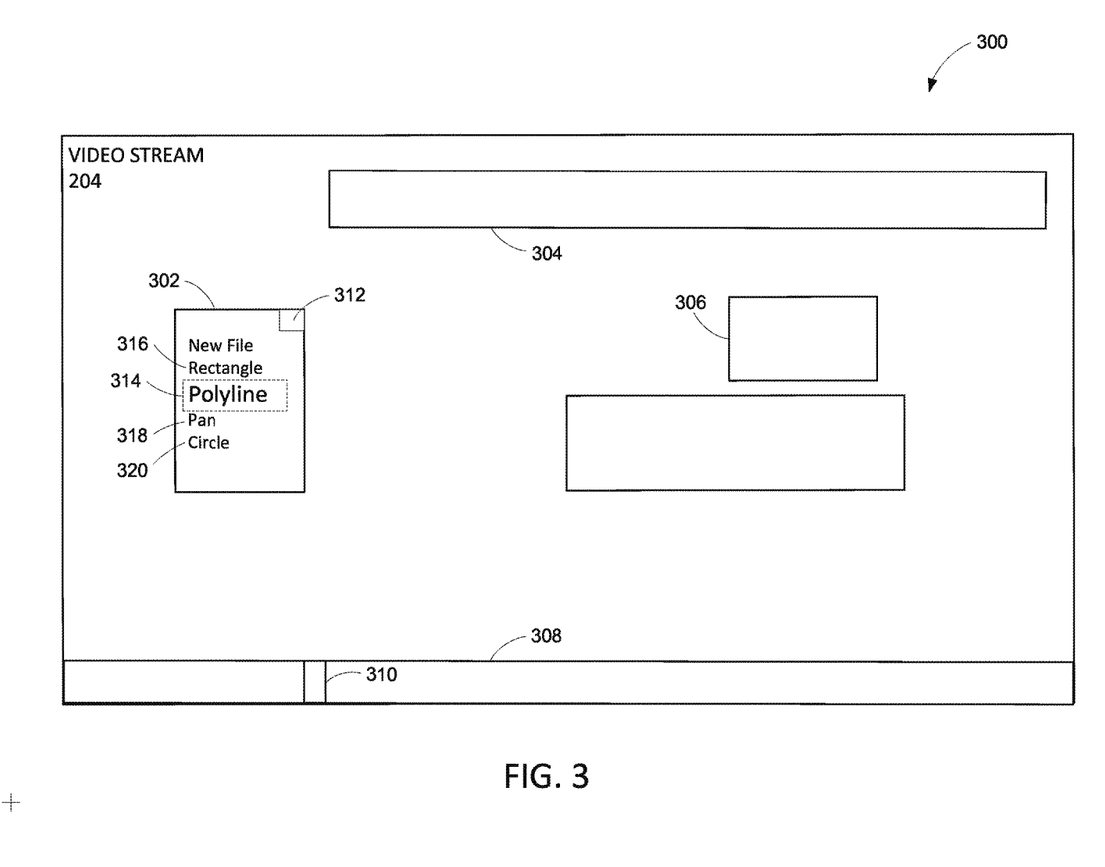
FIG. 3 illustrates a technique for displaying a video and a corresponding event list via the client device of FIG. 1, according to various embodiments of the present invention.

FIG. 3 illustrates a technique 300 for displaying a video and a corresponding event list via the client device 102 of FIG. 1, according In various embodiments of the present invention. As shown, an event list 302 is displayed within an area of the video stream 204. The video stream 204 and the event list 302 are displayed on the display 104 of the client device 102. The event manager 112 may cause the event list 302 to be displayed on the display 104. A media player or other software application may cause the video stream 204 to be displayed on the display 104. In some examples, the event list is translucent or semi-transparent in order to minimize the degree to which the video stream 204 is obstructed by the event list 302. In other embodiments, at least a portion of the event list 302 is displayed on in a region of the display 104 that does not overlap the video stream 204.

As shown in FIG. 3, the video stream 204 may include a software application tutorial for a drawing application. The video stream 204 includes a toolbar 304 of the software application and a rectangle 306 created by the software application. Furthermore, a media player may display a scrollbar 308 and a marker 310 that indicates a current playhead position of the video stream 204.

The event list 302 includes a collapse button 312 which can be selected to cause the event manager 112 to minimize or reduce a size of the event list 302. In one embodiment, the collapse button 312 may be selected to cause the event manager 112 to remove the event list 302 from display. In one embodiment, a pointer or other selection may be used to cause the event manager 112 to resize or reposition the event list 302. The event list 302 may also include a current event 314, a previous event 316, and a next event 318. As shown, the current event is 314 "Polyline" and is emphasized with larger text than other events in the event list 302. The current event 314 is also emphasized with a border that surrounds the current event 314. Further, in some embodiments, the event manager 112 causes the current event to remain emphasized for a threshold amount of time after completion of the event or completion of a command associated with the event.

As shown, the previous event 316 "Rectangle" is a command that was used to create the rectangle 306. Further, the video stream 204 is currently playing at a position that corresponds to the current event 314 that corresponds to executing the command "Polyline." In some embodiments, in response to receiving user input, the event manager 112 may cause the event list 302 to scroll upwards or downwards. For example, causing a pointer to move up while selecting an event in the event list 302 may scroll the event list 302 upwards. Causing the pointer to move down while selecting an event in the event list 302 may scroll the event list 302 down. Other scrolling devices, such as a mouse wheel, may provide similar scrolling functionality. As the event list 302 scrolls up or down, the event manager 112 causes new events appear to on the event list 302 and other events to be removed from the event list 302.

In the example embodiment, in response to receiving a selection of an event of the event list 302, the event manager 112 may communicate with a media player to cause the current playhead position to update to a different position in the video stream 204 that corresponds to the selected event. For example, receiving a selection of the event 320 "Circle" will cause the current playhead position to update to a different position in the video stream 204 that corresponds to a "Circle" command, as shown in FIG. 4.

Figure 4:
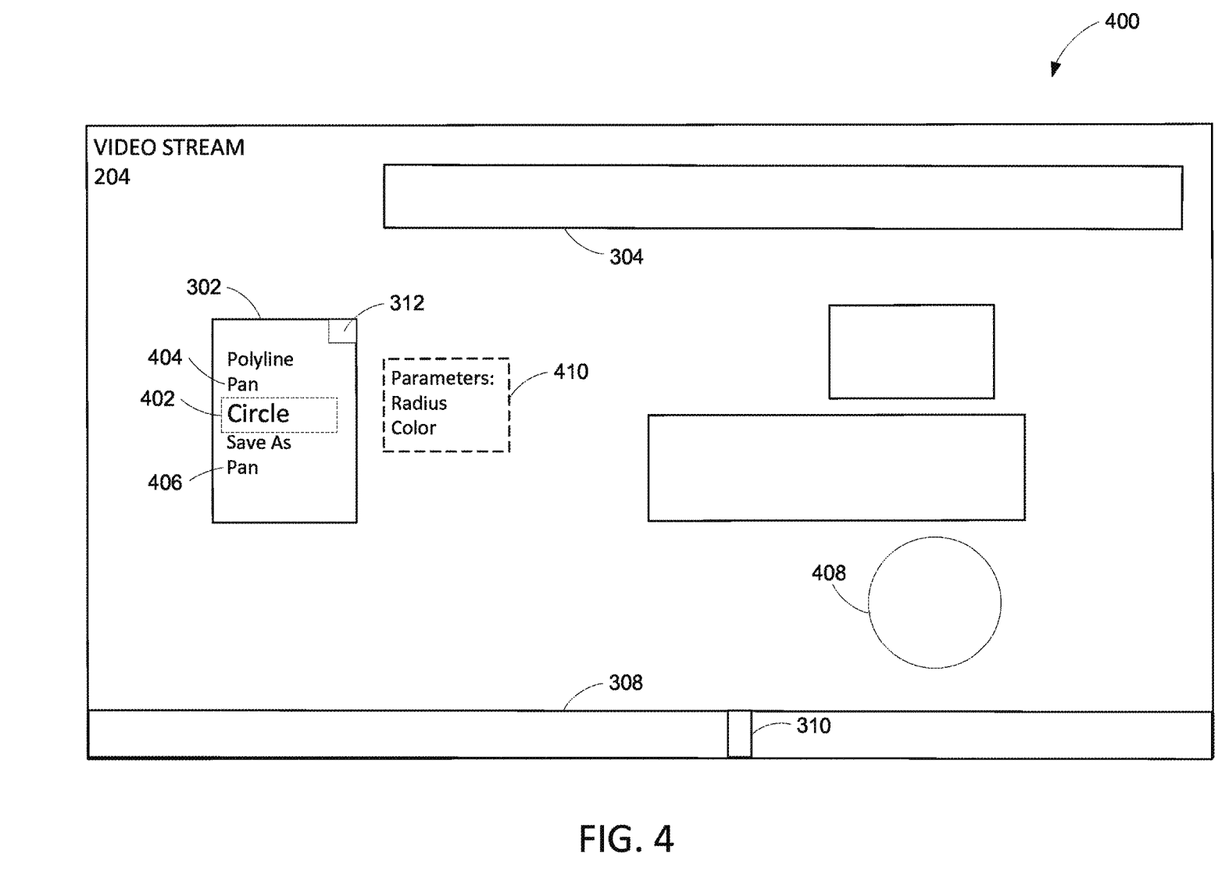
FIG. 4 illustrates a technique for displaying parameters associated with events included in the event list via the client device of FIG. 1, according to various embodiments of the present invention.

FIG. 4 illustrates a technique 400 for displaying parameters associated with events included in the event list via the client device of FIG. 1, according to various embodiments of the present invention. As shown, the event manager 112 causes the event list 302 is displayed within an area of the video stream 204. The video stream 204 and the event list 302 are displayed on the display 104 of the client device 102. The video stream may be displayed by a media player or other software application.

In the example embodiment, the video stream 204 is the software application tutorial described for FIG. 3. The video stream 204 includes the toolbar 304 of the software application and the rectangle 306 created by the software application. A media player displays the scrollbar 308 and the marker 310 that indicates the current playhead position of the video stream 204. As shown, the marker 310 has moved forward to a later position in the video stream 204, indicating that the playhead position moved to a later position in the video stream with respect to the played position for FIG. 3.

The event list 302 includes the collapse button 312 described above for FIG. 3. The event list 302 also includes a current event 402, a previous event 404, and a next event 406. As shown, the current event is 402 is now "Circle" and is emphasized with larger text than other events in the event list 302. The current event 402 is also emphasized with a border that surrounds the current event 402. In the example embodiment, the circle 408 was recently drawn in the video stream 204 and corresponds to the command associated with the current event 402. Thus, the event wheel 302 has scrolled upward with respect to FIG. 3.

As shown, a data 410 associated with the current event 402 is displayed. In the example embodiment, the event manager 112 causes the data 410 to be displayed in response to receiving a selection of the current event 402. The data 410 shown includes a list of parameters associated with the "Circle" command. The parameters shown are "Radius" and "Color." In other embodiments, any other number parameters or data values suitable for the selected event may be displayed. Further, any other event of the event list 302 may be selected to cause the event manager 112 to display data corresponding to the selected event.

Figure 5:
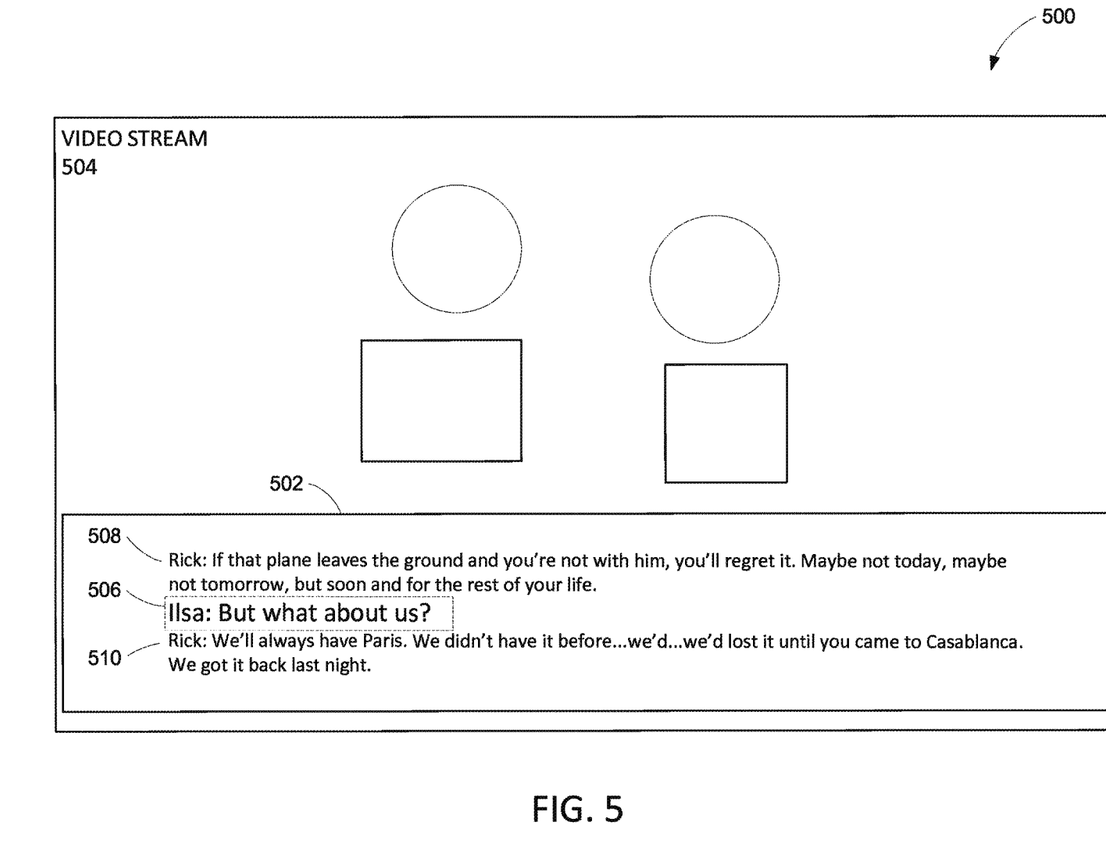
FIG. 5 illustrates a technique for displaying a movie and corresponding dialogue in an event list via the client device of FIG. 1, according to various embodiments of the present invention.

FIG. 5 illustrates a technique 500 for displaying a movie and corresponding dialogue in an event list via the client device of FIG. 1, according to various embodiments of the present invention. As shown, the event manager 112 causes the event list 502 to be displayed within an area of the video stream 504. A media player or other software application may cause the video stream 504 to be displayed. The video stream 504 and the event list 502 are displayed on the display 104 of the client device 102.

In the example embodiment, the video stream 504 includes a movie and corresponding dialogue. The event manager 112 causes the event list 502 to be displayed. The event list 502 includes a current event 506, a previous event 508, and a next event 510. As shown, the current event 506 is a portion of the dialogue and is emphasized with larger text than other events in the event list 502. Thus, a media player is currently displaying a portion of the video stream 504 that corresponds to the current event 506. The previous event 508 is a portion of dialogue that occurs earlier in the movie and the next event 510 is a portion of dialogue that occurs later in the movie. In the example embodiment, current event 314 is also emphasized with a border that surrounds the current event 314.

Figure 6:
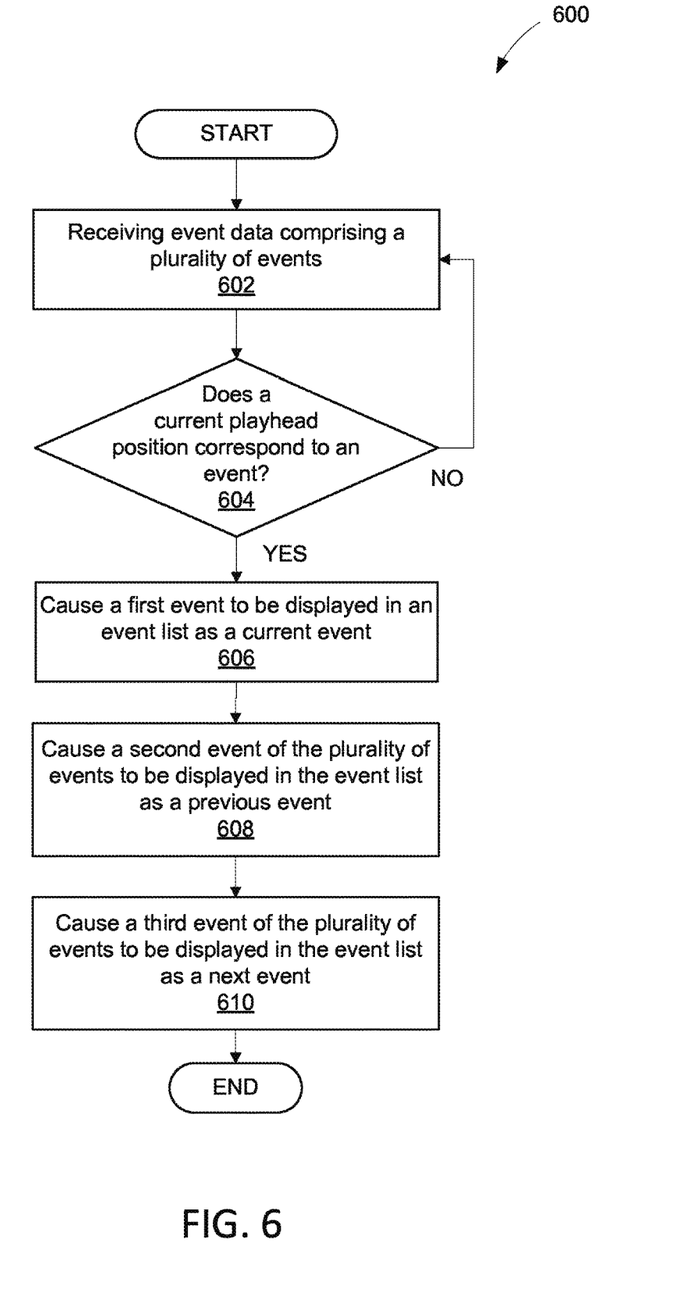
FIG. 6 is a flow diagram of method steps for generating chronological event information, according to various embodiments of the present invention.

FIG. 6 is a flow diagram of method steps 600 for generating chronological event information, according to various embodiments of the present invention. Although the method steps are described in conjunction with the device of FIG. 1, persons skilled in the art will understand that any device or system configured to perform either of the sets of method steps, in any order, fails within the scope of the present invention.

As shown in FIG. 6 a method 600 begins at step 602, where the event manager 112 receives event data comprising a plurality of events. Each event of the plurality of events is associated with a different position in a video stream. At step 604, the event manager 112 determines whether a current playhead position in the video stream corresponds to a first position in the video stream associated with a first event of the plurality of events. If the event manager 112 determines that the current playhead position in the video stream corresponds to the first position in the video stream associated with the first event of the plurality of events, then the method 600 proceeds to step 606. If the event manager 112 determines that the current playhead position in the video stream does not correspond to the first position in the video stream associated with the first event of the plurality of events, then the method 600 returns to step 602.

At step 606, the event manager 112 causes the first event to be displayed in an event list as a current event. For example, the event manager 112 may cause event 314 to be displayed in the event list 302 as the current event. At step 608, the event manager 112 causes a second event of the plurality of events to be displayed in the event list as a previous event. The second event is associated with a second position in the video stream that is before the first position in the video stream. For example, the event manager 112 may cause event 316 to be displayed in the event list as a previous event.

At step 610, the event manager 112 causes a third event of the plurality of events to be displayed in the event list as a next event. The third event is associated with a third position in the video stream that is after the first position in the video stream. For example, the event manager 112 may cause event 318 to be displayed in the event list as a next event.

Figure 7:
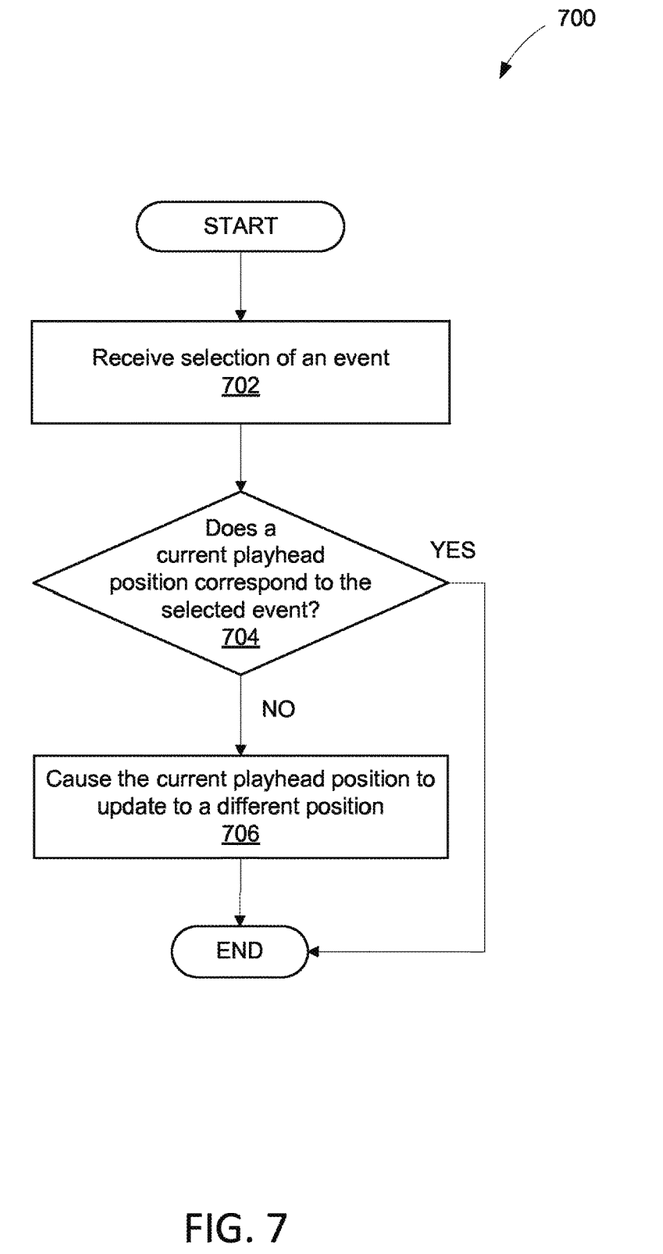
FIG. 7 is a flow diagram of method steps for updating a current playhead position for a video stream, according to various embodiments of the present invention.

FIG. 7 is a flow diagram of method steps 700 for updating a current playhead position for a video stream, according to various embodiments of the present invention. Although the method steps are described in conjunction with the device of FIG. 1, persons skilled in the art will understand that any device or system configured to perform either of the sets of method steps, in any order, falls within the scope of the present invention.

As shown in FIG. 7, a method 700 begins at step 702, where the event manager 112 receives selection of an event. At step 604, the event manager 112 determines whether a current playhead position in the video stream corresponds to the selected event. If the event manager 112 determines that the current playhead position in the video stream corresponds to the selected event, then the method 700 ends, if the event manager 112 determines that the current playhead position in the video stream does not correspond to the selected event, then the method 700 proceeds to step 706.

At step 706, the event manager 112 causes the current playhead position to update to a different position in the video stream that corresponds to the event. For example, the event manager 112 may communicate with a media player to cause the current playhead position to update from the position shown at FIG. 3 to the position shown at FIG. 4.

In sum, an event manager receives event data for multiple events. Each of the events is associated with a different position in a video stream. If the event manager determines that a current playhead position in the video stream corresponds to a position in the video stream associated with a particular event, then the event manager causes the particular event to be displayed in an event list as a current event. The current event may be emphasized in the event list. The event manager may also cause a second event to be displayed in the event list as a previous event and a third event to be displayed in the event list as a next event. During the playback of the video stream, the event manager may receive a selection of an event of the event list and in response, cause the current playhead position to update to a different position in the video stream that corresponds to the selected event. Additionally, the event manager may display data associated with a selected event of the event list.

Advantageously, the disclosed techniques enable a user to efficiently interact with and navigate through multimedia content, such as a video stream, without spending a significant amount of time locating various events in the multimedia content. Thus, the disclosed technique, among other things, increases the ability of a user to observe and obtain information from a video by providing efficient event navigation and event-related information.

One advantage of the techniques described herein is that less time is necessary to locate different events within multimedia content, such as a video stream. Therefore, a larger percentage of a user's time can be used to view multimedia content and a smaller percentage of time can be used to navigate within the multimedia content. Moreover, by selecting different events within an event list, a user can quickly and efficiently obtain information related to particular events that occur within multimedia content. Accordingly, a user can obtain information from multimedia content more efficiently. Additionally, a user can quickly locate and review captions in a video streams that includes speech, such as in a movie.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention has been described above with reference to specific embodiments. Persons of ordinary skill in the art, however, will understand that various modifications and changes may be made thereto without departing from the broader spirit and scope of the invention as set forth in the appended claims. For example, and without limitation, although many of the descriptions herein refer to specific types of media players and video streams, persons skilled in the art will appreciate that the systems and techniques described herein are applicable to other types of software applications, media, and content delivery techniques. The foregoing description and drawings are, accordingly, to be regarded in an illustrative rather than a restrictive sense.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for generating chronological event information, the method comprising:
  receiving event data comprising a plurality of events, wherein each event is associated with a different position in a video stream and corresponds to a different operation performed on a software application, wherein the operations corresponding to the plurality of events are visually captured in the video stream;
  in response to determining that a current playhead position in the video stream corresponds to a first position in the video stream associated with a first event of the plurality of events:
    causing a description of a first operation corresponding to the first event to be displayed in an event list as a current event, wherein the description of the first operation is selectable, and wherein a text of the description is visually overlaid on the video stream;
    causing a second event of the plurality of events to be displayed in the event list as a previous event, wherein the second event is associated with a second position in the video stream that is before the first position in the video stream; and
    causing a third event of the plurality of events to be displayed in the event list as a next event, wherein the third event is associated with a third position in the video stream that is after the first position in the video stream; and
  in response to receiving a selection of the description, causing a plurality of parameter values to be displayed in conjunction with the event list, wherein the plurality of parameter values were previously selected in the software application in conjunction with the first operation being performed on the software application.

2. The method of claim 1, wherein each of the plurality of events further corresponds to a different portion of conversation associated with the corresponding operation.

3. The method of claim 1, wherein the first event is associated with a plurality of positions in the video stream.

4. The method of claim 1, further comprising receiving a selection of an event of the event list.

5. The method of claim 4, wherein the selection corresponds to a pointer hovering over the event or a click input while the pointer is hovering over the event.

6. The method of claim 4, further comprising in response to receiving the selection of the event, causing data associated with the event to be displayed.

7. The method of claim 4, further comprising in response to receiving the selection of the event, causing the current playhead position to update to a different position in the video stream that corresponds to the event.

8. The method of claim 1, wherein causing the first event to be displayed in the event list as a current event comprises causing the first event to be displayed with an emphasis.

9. A non-transitory computer-readable storage medium including instructions that, when executed by a processing unit, cause the processing unit to generate chronological event information, by performing the steps of:
receiving event data comprising a plurality of events, wherein each event is associated with a different position in a video stream and corresponds to a different operation performed on a software application, wherein the operations corresponding to the plurality of events are visually captured in the video stream;
in response to determining that a current playhead position in the video stream corresponds to a first position in the video stream associated with a first event of the plurality of events:
causing a description of a first operation corresponding to the first event to be displayed in an event list as a current event, wherein the description of the first operation is selectable, and wherein a text of the description is visually overlaid on the video stream;
causing a second event of the plurality of events to be displayed in the event list as a previous event, wherein the second event is associated with a second position in the video stream that is before the first position in the video stream; and
causing a third event of the plurality of events to be displayed in the event list as a next event, wherein the third event is associated with a third position in the video stream that is after the first position in the video stream; and
in response to receiving a selection of the description, causing a plurality of parameter values to be displayed in conjunction with the event list, wherein the plurality of parameter values were previously selected in the software application in conjunction with the first operation being performed on the software application.

10. The non-transitory computer-readable storage medium of claim 9, wherein each of the plurality of events further corresponds to a different portion of conversation associated with the corresponding operation.

11. The non-transitory computer-readable storage medium of claim 9, wherein the first event is associated with a plurality of positions in the video stream.

12. The non-transitory computer-readable storage medium of claim 9, further comprising receiving a selection of an event of the event list.

13. The non-transitory computer-readable storage medium of claim 12, wherein the selection corresponds to a pointer hovering over the event or a click input while the pointer is hovering over the event.

14. The non-transitory computer-readable storage medium of claim 12, further comprising in response to receiving the selection of the event, causing data associated with the event to be displayed.

15. The non-transitory computer-readable storage medium of claim 12, further comprising in response to receiving the selection of the event, causing the current playhead position to update to a different position in the video stream that corresponds to the event.

16. The non-transitory computer-readable storage medium of claim 9, wherein causing the first event to be displayed in the event list as a current event comprises causing the first event to be displayed with an emphasis.

17. A computing device, comprising:
a memory; and
a central processing unit coupled to the memory, configured to:
receive event data comprising a plurality of events, wherein each event is associated with a different position in a video stream and corresponds to a different operation performed on a software application, wherein the operations corresponding to the plurality of events are visually captured in the video stream;
in response to determining that a current playhead position in the video stream corresponds to a first position in the video stream associated with a first event of the plurality of events:
cause a description of a first operation corresponding to the first event to be displayed in an event list as a current event, wherein the description of the first operation is selectable, and wherein a text of the description is visually overlaid on the video stream;
cause a second event of the plurality of events to be displayed in the event list as a previous event, wherein the second event is associated with a second position in the video stream that is before the first position in the video stream; and
cause a third event of the plurality of events to be displayed in the event list as a next event, wherein the third event is associated with a third position in the video stream that is after the first position in the video stream; and
in response to receiving a selection of the description, causing a plurality of parameter values to be displayed in conjunction with the event list, wherein the plurality of parameter values were previously selected in the software application in conjunction with the first operation being performed on the software application.

* * * * *